United States Patent [19]
Cunningham

[11] 3,718,749
[45] Feb. 27, 1973

[54] DEVICE FOR COUPLING HIGH VOLTAGE CABLES
[75] Inventor: Francis V. Cunningham, Western Springs, Ill.
[73] Assignee: Joslyn Mfg. and Supply Co., Chicago, Ill.
[22] Filed: July 19, 1971
[21] Appl. No.: 163,864

[52] U.S. Cl. ................174/73 R, 29/203 R, 29/267, 174/10, 174/78, 174/88 R, 254/105, 267/175
[51] Int. Cl. .............................................H02g 15/08
[58] Field of Search.........174/10, 73 R, 73 SC, 75 D, 174/78, 84 R, 84 C, 84 S, 88 R, 88 C, 88 S, 93; 339/14 R, 60 R, 61 R, 94 R, 103 C, 136 R, 143 R, 143 C, 251, 265 R; 267/70, 175, 177, 182

[56] References Cited

UNITED STATES PATENTS

| | | |
|---|---|---|
| 3,317,654 | 5/1967 | Yonkers ..........................174 73 R/ |
| 3,453,372 | 7/1969 | Gahir et al. ...................174/73 R UX |
| 3,485,935 | 12/1969 | Kreuger .......................174/73 R X |
| 3,509,518 | 4/1970 | Phillips..........................174/73 R UX |
| 3,558,799 | 1/1971 | Lee....................................174/73 R |
| 3,571,783 | 3/1971 | Lusk ..............................174/73 R UX |
| 3,580,986 | 5/1971 | Misare...............................174/73 R |
| 3,612,746 | 10/1971 | Sankey ..............................174/73 R |

Primary Examiner—Laramie E. Askin
Attorney—Richard D. Mason et al.

[57] ABSTRACT

There is provided a coupling assembly for connecting high voltage cables and including a tubular housing of insulating material. A pair of tubular elastomeric insulating members are inserted into respective ends of the housing for receiving the end portions of a respective cable. Retainers close the opposite ends of the housing. A conductive inner shield is in the housing bore spaced from opposite ends of the housing. Suitable connector means connect the conductors of the cables in the end-to-end relation within the housing shield. The shield is electrically connected to the conductor so as to eliminate voltage gradient in the air spaces within the coupler. Means are provided within the housing resiliently loading the tubular elastomeric insulating members, thereby maintaining a void-free insulation and moisture seals throughout the thermal operating range of the coupler.

15 Claims, 17 Drawing Figures

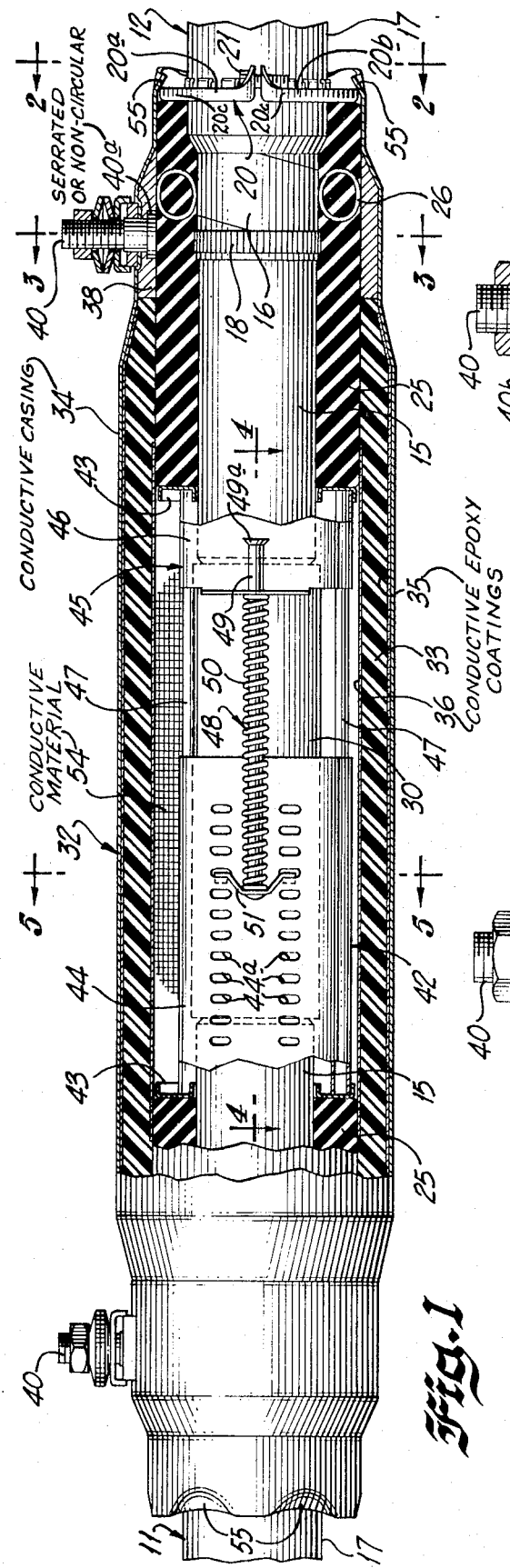
Fig. 1
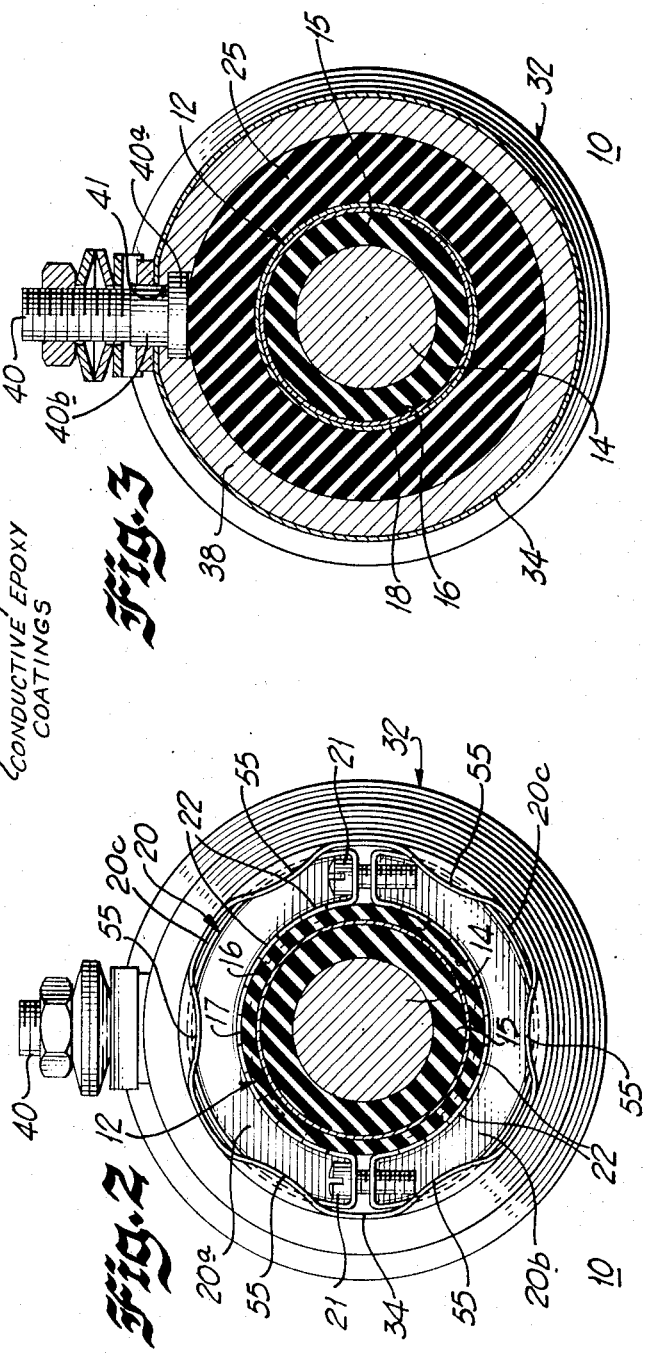
Fig. 3
Fig. 2
INVENTOR
FRANCIS V. CUNNINGHAM
by Mason, Kolehmainen,
Rathburn and Wyss.
ATTORNEYS.

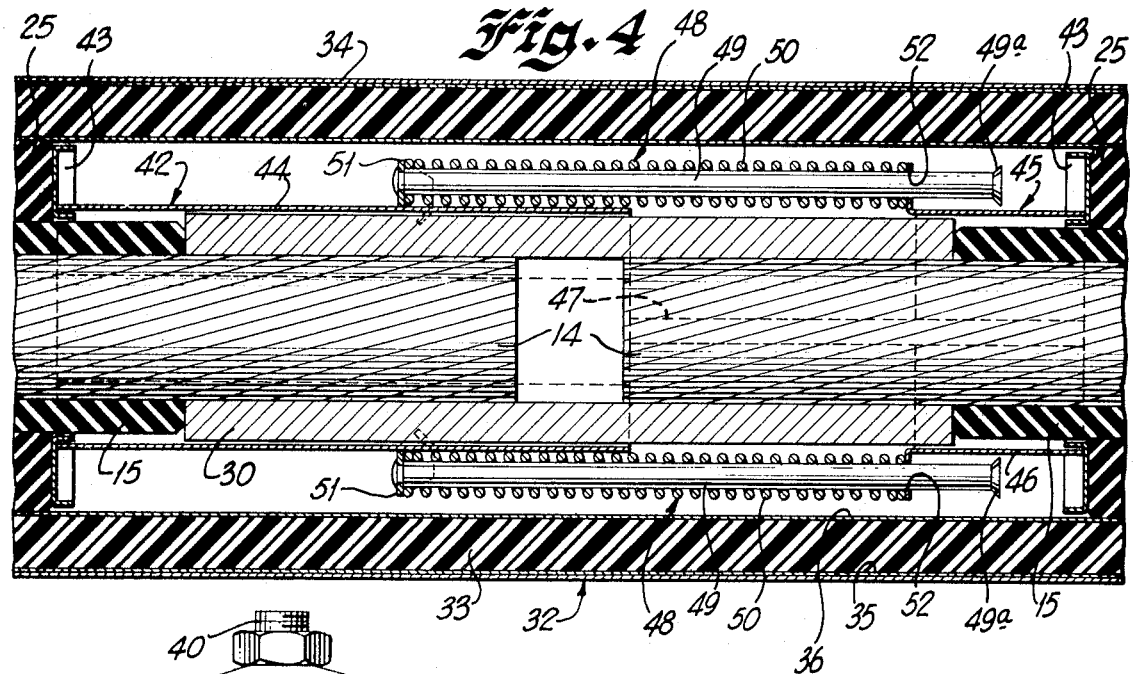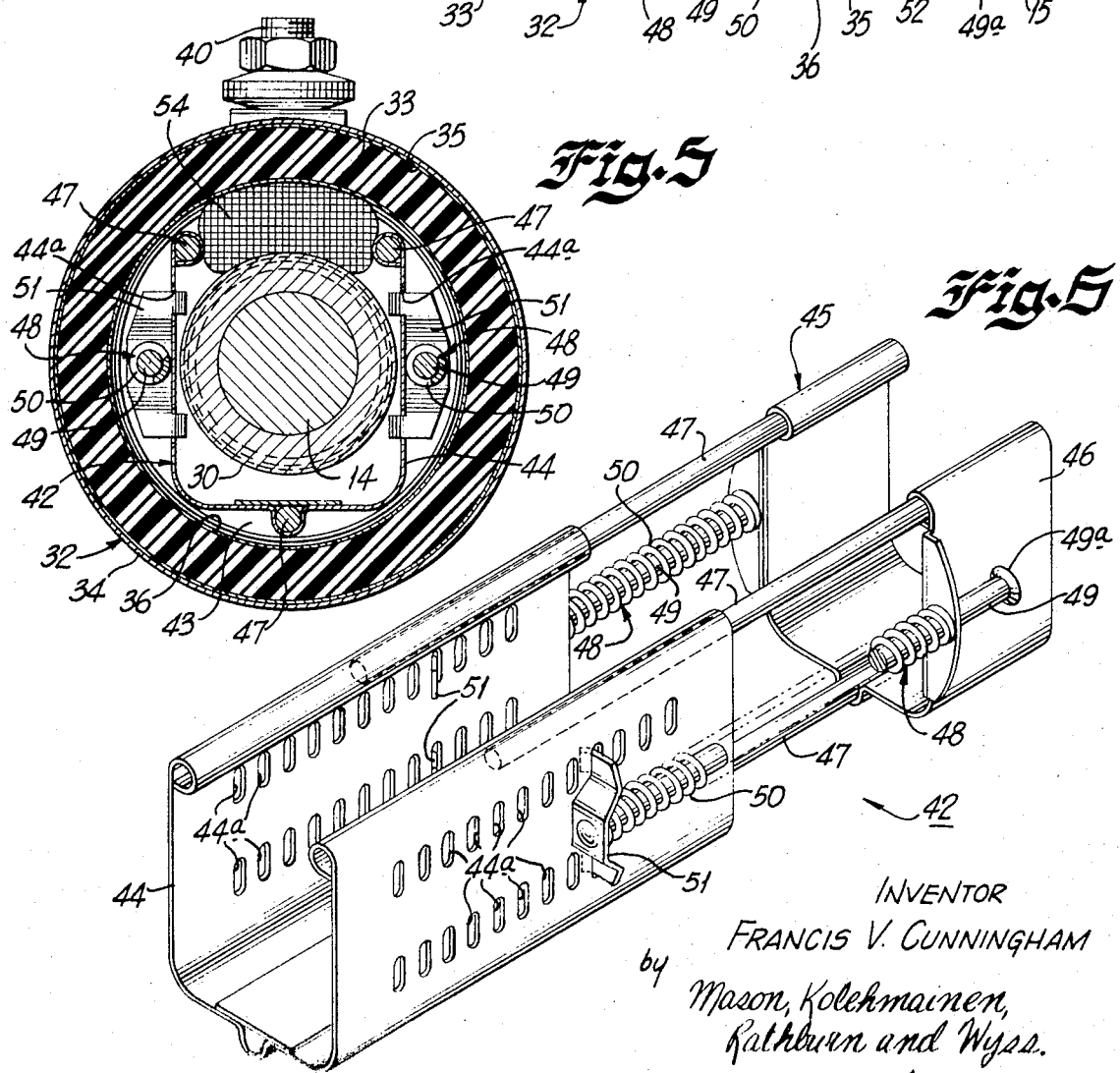

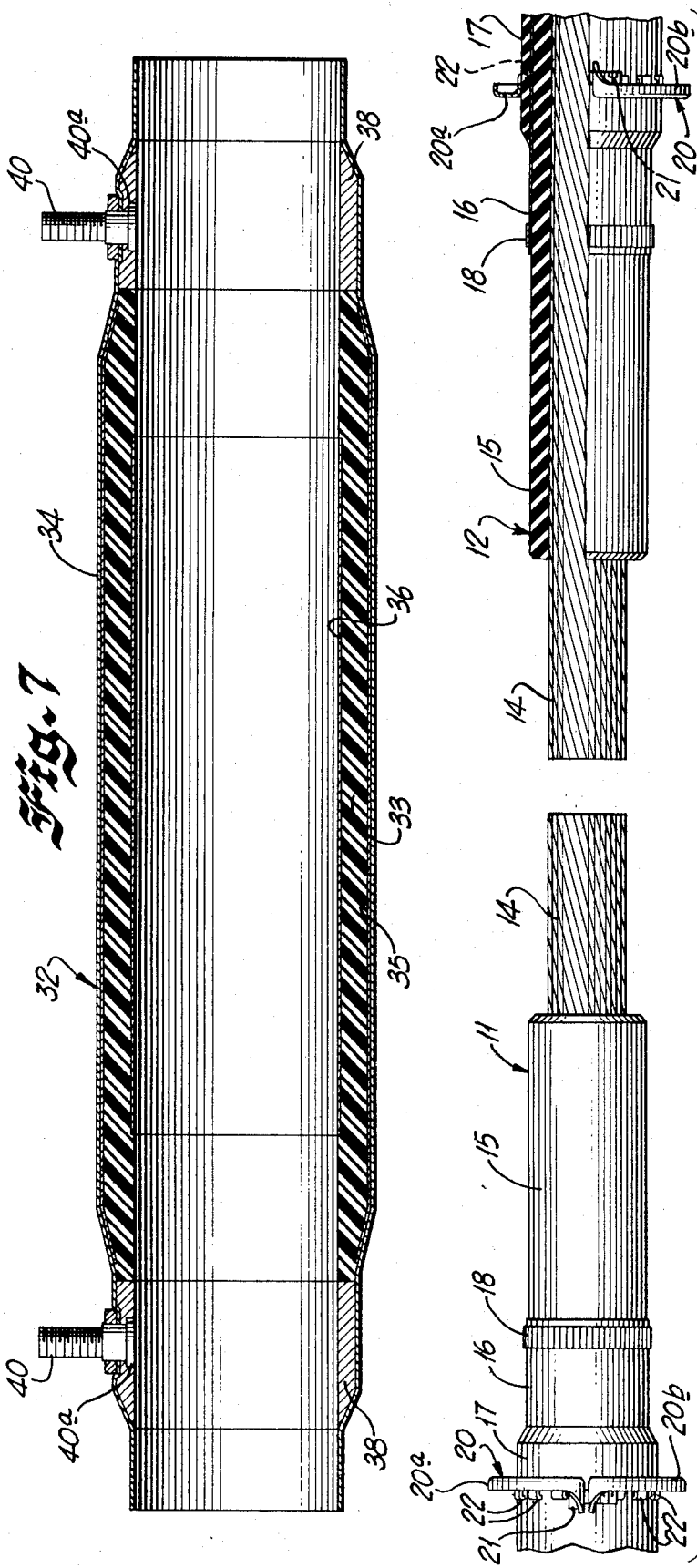
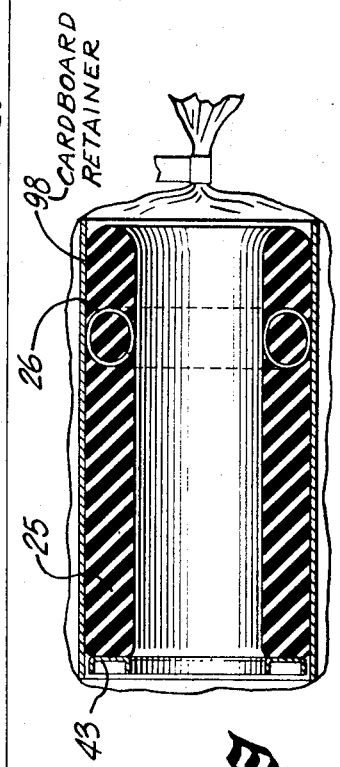

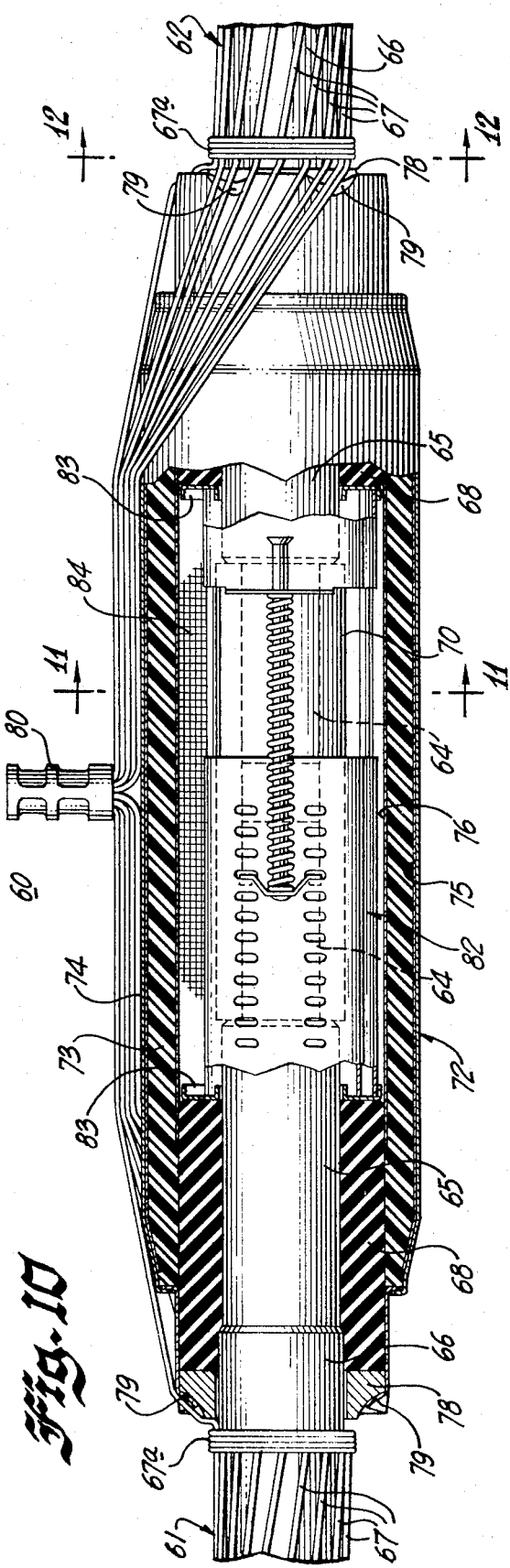
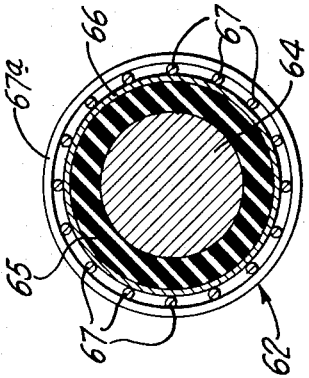
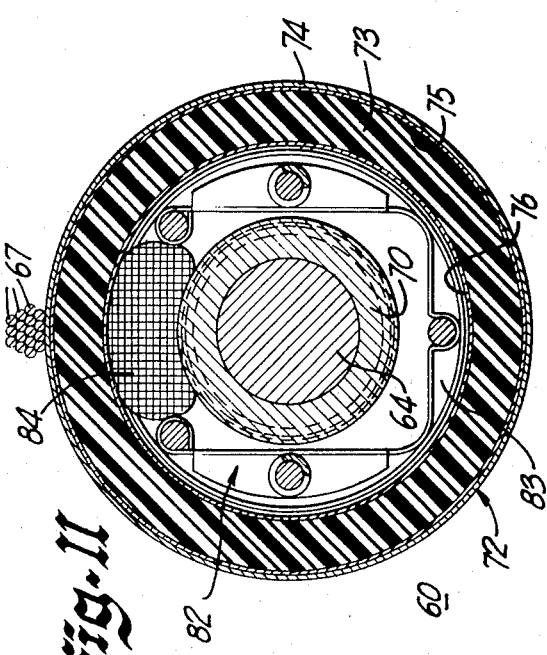
INVENTOR
FRANCIS V. CUNNINGHAM
by Mason, Kolehmainen,
Rathburn and Wyss.
ATTORNEYS.

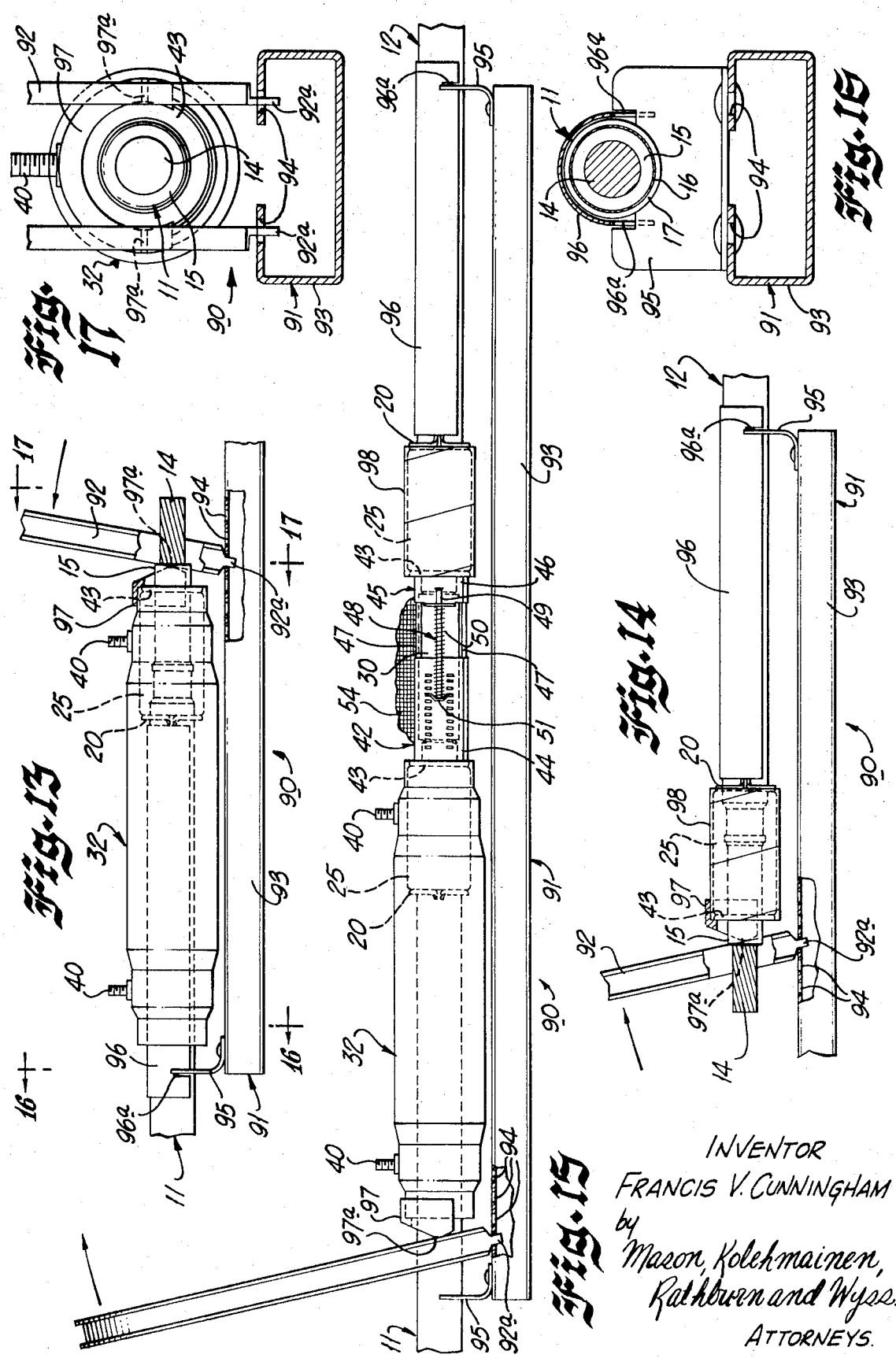

DEVICE FOR COUPLING HIGH VOLTAGE CABLES

The present invention is directed toward a new and improved corona-free coupling assembly used for connecting or splicing together high voltage cables including the kind generally used for underground power systems. The present invention is especially designed to provide a sealed, corona-free connection.

Various types of high voltage cables are in use. One common type, referred to as concentric neutral, comprises a cable having a central conductor, suitable shielded insulation around the central conductor, and a plurality of spirally wound individual drain wires on the cable outer shielded surface defining a grounded, shielding system of individual neutral wires. Yet another type of high voltage cable includes a central conductor covered with a suitable shielded insulation and having a metallic shielding or tape drain wrapped on the shielded insulation. A protective insulating jacket covers the metallic drain tape. Heretofore, expensive, time consuming, soldering of wire connections has been used to connect and ground metallic shielding or drain tape in maintaining the integrity of the grounding system to the coupling and between the adjacent cables.

Corona problems develop whenever sufficient electrical voltage gradient is present between spaced conducting elements, separated by air spaces or air pockets. Corona is deleterious to many insulating materials, often causing physical deterioration and chemical decomposition thereof.

The present invention has for an object the provision of a new and improved corona-free coupling assembly for use in connecting or splicing together high voltage cables of the type generally used in high voltage underground power distribution systems and the like.

Another object of the present invention is the provision of a new and improved coupling assembly for connecting high voltage coaxial grounded cables.

Another object of the present invention is to provide a new and improved coupling assembly for connecting high voltage cables and which is low in cost, easy to assemble, and small in size.

Still another object of the present invention is the provision of a new and improved coupling assembly for connecting high voltage cables of the type having a shielding drain of metallic tape or strip covered by a suitable protective jacket, in addition to other types of high voltage coaxial grounded cables.

Briefly, the foregoing and other objects and advantages of the present invention are accomplished in a new and improved corona-free coupling assembly for connecting high voltage cables which comprises a housing having an inner central sleeve of rigid insulating material and an external low resistance casing. A pair of tubular elastomeric insulating members are inserted into the respective ends of the housing and are each provided with an axial elongated bore for receiving the end portions of a cable. End retainers close the respective opposite ends of the housing. A tubular connector sleeve connects the central conductors of the cables in end-to-end relation within the housing. Suitable electrical contact means is provided for making electrical contact between the inner shield means and the connector sleeve. Suitable bias means are provided within the housing resiliently loading axially the tubular elastomeric insulating members so as to maintain air-free interfaces between the cable insulation, elastomeric members, and inside surface of the housing throughout the thermal range of the coupling assembly.

In one embodiment of the invention wherein the coupling is adapted for use with a high voltage cable of the type having metallic tape shielding drain, garter type electrical connector means is embedded within the tubular elastomeric insulating members adjacent one end thereof for electrically connecting the shielding drain tape to the external low resistance casing of the housing and to ground. In a preferred embodiment, a suitable collector ring of considerable mass with relation to the garter type connector is provided within the casing to transmit the electrical connection between the garter connector and the casing, thereby providing for heat dissipation and preventing localized heating resulting from high currents.

In another embodiment of the present coupling assembly when used with concentric neutral cable, the concentric neutrals are brought out over the coupling assembly, and are secured electrically together in any suitable manner.

For a better understanding of the present invention, reference may be had to the following detailed description taken in conjunction with the drawings in which:

FIG. 1 is a plan view, partly in broken away section, of an improved coupling assembly as applied to a metallic shielding tape type high voltage cable;

FIG. 2 is a cross sectional view of the coupling assembly of FIG. 1, taken along line 2—2 of FIG. 1;

FIG. 3 is a cross sectional view of the coupling assembly of FIG. 1, taken along line 3—3 of FIG. 1;

FIG. 4 is a fragmentary cross sectional view of the coupling assembly taken along line 4—4 of FIG. 1;

FIG. 5 is a fragmentary cross sectional view of the coupling assembly taken along line 5—5 of FIG. 1;

FIG. 6 is a perspective view of a biasing means used in the coupling assembly of FIG. 1;

FIG. 7 is a cross sectional view of the tubular housing of the coupling assembly of FIG. 1;

FIG. 8 is a side view of a metallic shielding tape type high voltage cable as prepared for assembly into the coupling assembly;

FIG. 9 illustrates one of the tubular insulating members as packaged during shipment;

FIG. 10 is a coupling assembly according to the present invention as applied to a concentric neutral type of high voltage cable;

FIG. 11 is a cross sectional view of the assembly of FIG. 10 taken along line 11—11 of FIG. 10;

FIG. 12 is a cross sectional view of the assembly of FIG. 10 taken along line 12—12 of FIG. 10;

FIG. 13 illustrates one step in the assembly of the coupling assembly onto the ends of adjacent high voltage cables;

FIG. 14 illustrates another step in the assembly of the coupling assembly onto the ends of adjacent high voltage cables;

FIG. 15 illustrates another step in the assembly of the coupling assembly onto the ends of adjacent high voltage cables;

FIG. 16 illustrates the assembly of FIG. 13, taken along line 16—16 of FIG. 13; and FIG. 17 illustrates the assembly of FIG. 13 taken along line 17—17 of FIG. 13.

Referring now to the drawings, and particularly to the embodiment of FIGS. 1-9, therein is illustrated a coupling assembly 10 according to the present invention joining the ends of a pair of high voltage cables 11, 12. A typical metallic tape shielding drain type high voltage cable is illustrated in FIG. 8, with ends thereof prepared for joining with the coupling assembly 10 in accordance with the present invention. More specifically, the cables 11 and 12 each includes a central conductor 14 which may have conductive shielding material molded or taped to its surface to minimize voltage stressing of air space between the strands of the central conductor and solid insulation 15 which covers the central conductor 14. A conductive shielding material similar to that applied to the conductor is molded or wrapped over the insulation 15 to exclude all air from between the insulation and shielding. A thin metallic tape 16, often 4 or 5 mil copper, is then applied around the shield. The metallic tape 16, when grounded at the cable ends, keeps the shielding tape at near ground potential by draining the displacement current of the cable and by conducting fault currents to ground. A protective insulating jacket 17 covers the metallic tape 16. In preparing the cable end of the cable 11 for joining with an adjacent cable, the outer layers including the insulation are stripped back for a desired distance to expose a length of the central conductor 14. The protective jacket 17 and the shielding 16 are also stripped back to expose a length of insulation 15. The protective jacket is further stripped back, exposing the metallic tape. Securing tape 18, such as of copper foil, is wrapped around the loose end of the metallic tape to prevent unravelling thereof.

A retainer 20 is assembled on each of the cables 11 and 12 near the end of the protective insulating jacket 17. In the illustrated embodiment the retainer 20 is of the split ring type, having identical portions 20a, 20b held together by suitable fastening, such as screws 21. Each of the sections 20a, 20b, of the retainer 20 includes an axially extending outer flange 20c, and a plurality of inner, axially extending fingers having radially inwardly extending projections 22 which grip into the protective insulating jacket 17, but which are too short to bite through the jacket into the metallic tape 16. Advantageously the retainer prevents creeping of the protective jacket 17 out of the coupling, retains the elastomeric fillers 25 within the housing, and further provides for locking in of the joined housing after assembly.

An elastomeric filler 25, generally sleeve-shaped and of electrically insulating material, is placed over each of the cable ends of the cables 11 and 12. The filler 25 includes a garter type conductive ring 26 embedded therein, the inner diameter of which engages the respective metallic tape 16 of each of the cables 11 and 12. The elastomeric filler 25 is positioned outwardly from the end of the cable against the retainer 20.

A connector sleeve 30 fits over the adjacent exposed ends of the central conductors 14 in the cables 11 and 12 and may be fastened thereto in any desired manner as by crimping, thereby establishing the electrical integrity of the cables 11 and 12.

The cable ends are enclosed within a suitable elongated or tubular housing 32 having an inner central sleeve 33 of insulating material such as an insulating epoxy enclosed within an external low resistance tubular casing 34 of stainless steel or other suitable material in a preferred embodiment, the sleeve 33 is formed of an integrally cast, dielectric polymer joined together in situ with or formed in situ within the casing 34. The outer surface of the inner sleeve 33 is coated with a conducting epoxy coating 35, thus eliminating any possibility of voids or air spaces between the insulating material and ground. Additionally, an inner epoxy sleeve 36 of conducting material extends through the central portion of the inner sleeve 33 intermediate the ends thereof to prevent voids or air spaces between the conducting and insulating materials, and to prevent electrical stressing of the air space around the connector sleeve 30.

As previously indicated, the conductive ring 26 connects the casing 34 to the metallic tape 16 of the cables 11 and 12. Advantageously, a collector ring 38 of suitable electrically conductive material may be contained within the casing 34 outwardly of the inner sleeve 33 to provide electrical contact with the conductive ring 26 and to provide good electrical contact with suitable grounding studs 40, here shown with their heads 40a pressed into the collector ring 38. In assembly, a hole 41, FIG. 3 is drilled or otherwise formed in the collector ring 38; and the shank 40b of the stud 40 is force driven into the hole. Moreover the head 40a of the stud 40, which preferably is serrated or has an otherwise noncircular cross section, is also driven or die-cut into the collector ring by the mere continuation of the driving force applied to the shank. The head 40a will cut into the collector ring providing a secure connection. Thus, the collector ring 38 provides a heat sink for the grounding currents, and provides a low resistance, large area of contact with the grounding studs 40.

The elastomeric fillers 25 are maintained under axial bias to provide a continuing seal and air-free interfaces throughout the thermal operating conditions of the coupling assembly 10. Any suitable biasing means may be used; however, it has been found advantageous to provide a biasing arrangement which may be assembled after crimping of the conductor sleeve. To this end, there is provided a spring biasing assembly 42 compressed between cupped washers 43 for the elastomeric filler 25. More specifically, the spring biasing assembly 42 includes U-shaped slotted slide 44 having two rows of adjusting slots 44a on each face. Cooperating with the slotted slide 44 is a slide assembly 45 having a generally U-shaped body 46 and a plurality of slide rods 47 each slidably received within a suitable retaining portion of the slotted slide 44. A pair of spring assemblies 48, each including a guide rod 49, spring 50, and spring retainer clip 51, is compressed with the guide rod 49 extending through suitable guide openings 52 in the body 46, and the retainer clip 51 being adjustably positioned in a selected pair of the slots 44a in the slotted slide 44 so as to provide the desired compression in the spring 50. The free end 49a of the guide rod 49 extending through the respective guide opening 52 may be flared or turned out to prevent disassembly of the spring assemblies 48 from the body 46 during handling and shipping of the coupling assembly 10.

The free ends of the casing 34 are peened over, as illustrated at 55, to lock the housing 32 into position. Moreover, advantageously it will be seen that the grounded integrity of the system is maintained as between the metallic tape 16 on the respective cables 11 and 12, through the conductive rings 26, and conductive casing 34. Moreover, either or both ends of the housing 32 may be grounded through the grounding studs 40, as desired.

To prevent electrical stressing of the air space around the connector sleeve 30 and spring biasing assembly 42, it is necessary that the conductive coating 36 be at the same electrical potential as the internal components of the joint. Accordingly, suitable conductive material, such as a wad of copper mesh 54 is inserted within the air space making electrical contact between the connector sleeve 30, spring biasing assembly 42, and conductive coating 36.

From the foregoing description, it will be understood that there is provided a new and improved coupling assembly having a small diameter and length, and suitable for joining the ends of high voltage cable, particularly of the metallic tape drain type.

FIGS. 10–12 illustrate a modification of the coupling assembly adapted for joining concentric neutral type cable. More specifically, as therein illustrated, there is provided a coupling assembly 60 for connecting the adjacent ends of a pair of concentric neutral cables 61, 62. Each of the cables 61, 62 includes a central conductor 64 covered with a suitable layer of insulation 65 having inner and outer conductive shielding material on its surface to prevent electrical stressing of air adjacent the insulation. A conductive layer 66 covers the insulation 65. The cable is wound with a plurality of strands of wire defining spiral, concentric neutral strands 67.

The ends of the cables 61 and 62 are prepared in a manner similar to that heretofore described, and more specifically the insulation 65 is stripped a sufficient distance to expose the central conductors 64. Thereafter, the conductive layer 66 is stripped from the insulation 65 a sufficient distance to provide electrical insulation to the central conductor 64. Moreover, the strands of grounding wire 67 are unwound a sufficient distance to clear the cable joint, and one or more of the strands may be wound around the wire, as illustrated at 67a to secure the loose ends thereof.

A suitable retaining ring 78 and an elastomeric filler 68 are slipped over each end of the cables 61 and 62. The elastomeric filler 68 extends from the grounding layer 66 toward the end of the cable. Cup shaped retaining washers 83 are placed against the inner end of the elastomeric filler 68. A connector sleeve 70 is fitted over the exposed ends of the central conductor 64 and is crimped or otherwise electrically and mechanically secured thereto.

A housing 72 is provided over the entire joint, and includes an inner sleeve of insulating material 73 such as epoxy, and an outer casing 74 of suitable low resistance material such as stainless steel or the like. An outer conductive coating 75 of conductive epoxy or other suitable material covers the outer surface of the inner sleeve 73, and an inner sleeve 76 of suitable electrically conductive material, such as an epoxy conductive coating, is formed on the inner surface of the inner sleeve 73 intermediate the ends thereof and radially outwardly of the energized inner components of the joint.

The retaining rings 78 are of rigid material engaging the conductive layer 66 on the cables 61 and 62. After assembly, the casing 74 of the housing 72 may be peened over, as illustrated at 79. The wound strand or strands 67a of the grounding strands 67 will prevent axial shifting of the rings 78 and therefore of the housing 72. The grounding strands 67 pressing against the outer casing 74 provide for grounding of the casing. The grounding strands 67 of the two cables 61 and 62 are secured together by a suitable coupling sleeve 80, here shown as of the compression type.

The elastomeric fillers 68 are held under axial pressure by a spring biasing assembly 82, which may be of any desired type, but which is shown identical to the spring biasing assembly 42 previously described. The spring biasing assembly 82 provides axial bias against the retaining washers 83 along the inner end of the elastomeric fillers 68, thereby continuously spring loading the elastomeric fillers and maintaining them in sealing and void-free interfacial relation with the cable insulation 65, the inner sleeve 73 and the core of the housing 72. A wad of copper mesh 84 inserted in the connector area of the coupling assembly 60 provides for good electrical contact between the connector sleeve 70, the spring biasing assembly 82, and the inner conductive coating 76 on the housing 72, thereby eliminating electrical gradients in the air space of the connector area.

FIGS. 13–17 illustrate a method of assembly for a coupling assembly, and is here shown with reference to a metallic shield grounding tape type of high voltage cable. A jig or jack 90, including a jack base 91, and a jack lever 92 is provided for supporting and assembling the cable joint. More specifically, the jack base 91 includes an elongated base rail 93 being provided along its upper surface with two rows of spaced apart jack holes or slots 94. Adjacent each end of the base rail 93 is provided an upwardly extending end support 95 having a somewhat U-shaped or semicircular recess in its upper edge to receive or support the respective cables 11 and 12. Also included with the jack 90 is an elongated half-round channel brace 96 which may be selectively placed over one of the cables 11 or 12, and which is provided with opposed slots 96a fitting over the free end of the end supports 95 to fix or position the brace. Also included with the jack is a somewhat U-shaped or semicircular force pad 97 which also may be placed over a selected one of the cables 11, 12, and which includes a fulcrum 97a for forcing with the lever 92. The jack lever 92 is a bifurcated rod having end portions 92a which may be placed within the slots 94 in the base rail 93 for prying against the force pad 97.

As supplied disassembled, one of the elastomeric fillers 25 is shipped within the housing 32; the other of the elastomeric fillers 25 is shipped in a filler retaining tube 98 of cardboard or other suitable disposable material, FIG. 9.

In the assembly of the cable coupler, the ends of the cable are prepared essentially as shown in FIG. 8, the central conductor 14 being exposed for a desired length, there being a short length of metallic shield grounding tape 16 exposed beyond the end of the protective jacket 17. The layer of securing tape 18 is wound on the shield grounding tape 16 to prevent unravelling of the tape 16. Thereafter, the retainers 20 are secured to the respective ends of the protective jacket 17. After the cable ends have been prepared, the left-hand cable 11 is set into the jack base. The half-round base 96 will be placed over the cable between the jack end support 95 and the assembled jacket retainer 20. If necessary, the half-round brace 96 may be fastened in place. Silicone grease is applied to the insulation, copper tape, and cable jacket up to the retainer. Thereafter, the joint housing 32 containing one of the elastomeric fillers 25 will be pushed over the greased cable end of cable 11, as shown in FIG. 13, thereby forcing the cable through the housing and into the internal elastomeric filler 25 exposing the central conductor 14 of the cable end. With the retaining washer 43 in place, the force pad 97 will be placed over the housing 32 end, and the jack lever 92 may be used to force the housing and internal elastomeric filler 25 over the cable until excessive force indicates that the elastomeric filler 25 is properly set or seated against the retainer 20.

The right-hand cable 12 may then be inserted into the jack base, as shown in FIG. 14. The half-round brace 96 will now be placed over the right-hand cable between the end support 95 and the retainer 20 of the right-hand cable. If it is necessary to hold the cable in place, the channel brace 96 may be fastened to the jack 90. Silicone grease will be placed over the insulation, copper tape, and cable jacket up to the jacket retainer of the right-hand cable 12, in like manner as with the cable 11. The elastomeric filler 25 for the right-hand cable will come enclosed within the filler retaining tube 98, FIG. 9, and with the elastomeric filler 25 still in the tube 98, the elastomer will be pushed over the greased cable end by pressing against the retaining washer 43 thereof. The force pad 97 and jack lever 92 may be used to force the elastomeric filler 25 and its enclosing retaining tube 98 over the right-hand cable until the elastomeric filler 25 is seated solidly against the retainer 20 of the right-hand cable 12.

The connector sleeve 30 may then be assembled over the exposed central conductors 14 and crimped into place.

With the cable and joint assemblies in the jack 90, and the half-round brace 96 over the right-hand cable between the jack base and support 95 and the retainer 20, the spring biasing assembly 42 may be slipped into place. To this end, the slotted slide 44 and the body 46 containing the slide assembly 45 may be inserted over the connector sleeve 30 and set into washers 43. The jack lever 92 may be used alternately to compress the springs toward the body 46 of the spring biasing assembly 42 and to align the respective retainer clips 51 into a suitable set of slots 44a to provide the desired compression to the springs. Suitable copper mesh pad 54 is fit snugly into the open upper ends of the spring biasing assembly 42 and along the length of the compression connector.

The force pad 97 is then placed over the left end of the joint housing 32, as shown in FIG. 15, and the jack lever 92 is used to force the housing 32 toward the right. As the housing 32 moves into and over the mesh pad 54, the pad may be held in place by hand or with a screwdriver, if necessary, to keep the mesh pad in place over the compression connector. Continued force with the jack lever 92 will force the housing 32 over the right-hand elastomeric filler 25, forcing the filler retaining tube 98 off the elastomeric filler 25, the housing 32 will be centered relative to the retainer at each end of the housing, and a hammer may be used to peen the housing ends snugly against the retainers. Suitable grounding through the grounding studs may be made in accordance with the desired application.

It will be understood that the right-hand elastomeric filler 25 supplied within the filler retaining tube 98 is prestressed radially, so that removal of the filler retaining tube 98 upon forcing of the housing 32 to the right will permit the elastomeric filler 25 to expand progressively radially outwardly against the inner surface of the housing components. The filler retaining tube 98, after it has been forced entirely off the elastomeric filler 25, may be removed in any convenient manner.

Although the present invention has been described by reference to several embodiments thereof, it will be apparent that numerous other modifications and embodiments will be devised by those skilled in the art which will fall with the true spirit and scope of the present invention.

What is claimed as new and desired to be secured by Letters Patent of the United States is:

1. In combination, a pair of high voltage cables and a coupling assembly joining said cables in end-to-end relation, said coupling including an insulating housing a bore through said housing, a pair of tubular elastomeric insulating members in respective ends of said housing bore and surrounding respective ends of said cables, means connecting the conductors of said cables in end-to-end relation, conductive shield means along the bore of said housing and spaced from opposite ends thereof, conductive means connecting said conductors electrically to said shielding means, bias means within said housing resiliently loading said elastomeric members in sealing relation with said cable ends and said housing, and means retaining said elastomeric members within said housing.

2. A coupling assembly comprising a tubular housing of insulating material and an external low resistance casing; a pair of tubular elastomeric insulating members in respective ends of said housing and each enclosing the end portions of a cable; retainers at the respective opposite ends of said housing; connector means connecting the central conductors of the cables in end-to-end relation intermediate said insulating members; and bias means within said housing for resiliently loading said tubular elastomeric insulating members.

3. A device for joining the end portions of high voltage cables having a first elongated tubular insulating member receiving said end portions, means conductively connecting said end portions, and second and third insulating members at opposite longitudinal extremities of said first member positioned between said end portions and said first member for reducing the tendency of corona to form at said longitudinal extremities, wherein the improvement comprises an assembly for retaining said second and third members in position between said end portions and said first member comprising a pair of split ring members positioned around each of said end portions, each of said ring members having an integral section positioned in abutment with said end portion and extending in the direction of the longitudinal axis of said end portion and radially inwardly extending projections for engaging said end portion, said assembly further comprising means for securing said ring members together around said end portion.

4. A device for joining the end portions of high voltage cables having a first elongated tubular insulating member receiving said end portions of said cables, means conductively connecting said end portions of said cables, and means positioned between said end portions of said cables and the opposite longitudinal end portions of said first member for reducing the tendency of corona to form at said opposite longitudinal end portions of said first member, wherein the improvement comprises means within said first member for biasing said reducing means into position between said end portions of said cables and said opposite longitudinal end portions of said first member.

5. A device as set forth in claim 4 wherein said biasing means comprises a spring assembly adjustable to a preselected compression force.

6. A device for joining the end portions of high voltage cables of the type having a central current carrying conductor and a conductive shielding drain surrounding said central conductor, said device having an elongated housing receiving said end portions and means conductively connecting said end portions, wherein the improvement comprises means for conductively connecting said drain to a source of ground or reference potential, said conductively connecting means comprising a conductive ring positioned about said drain, means for electrically connecting said drain to said conductively connecting means and a conductive member having a head portion forced fit into a hole of said conductive ring, said conductive member being electrically connected to a source of ground or reference potential.

7. A device for joining the end portions of high voltage cables of the type having a central current carrying conductor and a conductive shielding drain surrounding said central conductor comprising an insulating housing,
a bore through said housing,
means within said housing bore conductively connecting said central conductors,
a pair of insulating members at least partially within respective ends of said housing bore surrounding said end portions,
a conductive shield along the bore of said housing and spaced from the opposite ends of said housing,
conductive means within said bore electrically connecting the central conductors of said cables to said shield,
bias means within said housing resiliently loading said insulating members in sealing relation with said end portions and said housing, and
means for retaining said insulating members within said housing.

8. A device as set forth in claim 7 wherein at least one of said pair of insulating members includes a garter type conductive ring aligned to conductively engage the drain of one of said cables for conductively connecting said drain to a source of reference or ground potential.

9. A device as set forth in claim 8 further comprising a pair of collector rings, each one of said pair of collector rings disposed at opposite ends of said housing and formed of a mass of electrically conductive material having a substantially greater mass than the mass of said garter type ring to thereby provide a good conductive contact for forming a conductive connection between said drain and a source of reference or ground potential and to provide an effective means for dissipating heat formed by the currents passing through said collector ring.

10. A device as set forth in claim 7 wherein said conductive means comprises a mass of metal mesh.

11. A device as set forth in claim 7 wherein said bias means comprises a spring assembly adjustable to a preselectable compressive force.

12. A device as set forth in claim 7 wherein said bias means comprises a first elongated, generally U-shaped member having slots spaced along its longitudinal direction, a second generally U-shaped member, guide means interconnecting said first and said second U-shaped members and spring members biasing said first and said second U-shaped members apart.

13. A device as set forth in claim 12 wherein said bias means further comprises retaining means selectively engaging at least one of said slots to maintain the bias of said bias means at a preselected value.

14. A device as set forth in claim 7 further comprising a conductive casing surrounding said housing.

15. A device as set forth in claim 14 wherein said housing comprises an integrally cast, dielectric polymer, joined together in situ with said casing.

* * * * *